(12) United States Patent
Howarth et al.

(10) Patent No.: US 8,098,160 B2
(45) Date of Patent: Jan. 17, 2012

(54) METHOD AND SYSTEM FOR REMOTELY PROVISIONING AND/OR CONFIGURING A DEVICE

(75) Inventors: Arthur G. Howarth, Orleans (CA); Chandroadya Prasad, Sunnyvale, CA (US); Patrick Wetterwald, Mouans Sartoux (FR); Prasad Miriyala, Union City, CA (US); Pascal Thubert, La colle sur Loup (FR); Vincent Jean Ribiere, Biot (FR); Roland Saville, Oakland Park, FL (US)

(73) Assignee: Cisco Technology, Inc., San Jose, CA (US)

( * ) Notice: Subject to any disclaimer, the term of this patent is extended or adjusted under 35 U.S.C. 154(b) by 46 days.

(21) Appl. No.: 12/113,348

(22) Filed: May 1, 2008

(65) Prior Publication Data
US 2008/0204199 A1 Aug. 28, 2008

Related U.S. Application Data

(63) Continuation-in-part of application No. 11/656,660, filed on Jan. 22, 2007.

(51) Int. Cl.
*G08B 13/14* (2006.01)
(52) U.S. Cl. .................. 340/572.1; 340/572.4; 340/679; 340/12.29; 340/12.51; 340/13.26; 340/10.41; 340/657
(58) Field of Classification Search .................. 340/10.5, 340/10.1, 10.51, 572.2, 5.8; 455/410, 551, 455/552.1
See application file for complete search history.

(56) References Cited

U.S. PATENT DOCUMENTS

| | | | | |
|---|---|---|---|---|
| 5,974,500 | A | 10/1999 | Maletsky et al. | |
| 6,046,676 | A * | 4/2000 | Ward et al. | 340/572.1 |
| 7,106,175 | B2 * | 9/2006 | Lewis | 340/10.34 |
| 7,148,803 | B2 | 12/2006 | Bandy et al. | |
| 7,180,422 | B2 * | 2/2007 | Milenkovic et al. | 340/572.4 |
| 7,240,848 | B1 | 7/2007 | Dressen et al. | |
| 7,436,307 | B2 * | 10/2008 | Emmanuel | 340/572.4 |
| 7,450,008 | B2 * | 11/2008 | Erickson et al. | 340/572.1 |
| 7,580,361 | B2 * | 8/2009 | Ohara | 370/241 |
| 2004/0153539 | A1 * | 8/2004 | Lyon et al. | 709/224 |

(Continued)

FOREIGN PATENT DOCUMENTS
WO 2005081088 A1 9/2005

OTHER PUBLICATIONS

"Asset Identification EEPROM—AT24RF08C Datasheet, Rev. 1072E-09/99," Copyright Atmel Corporation 1999.
"RFID External EEPROM Interface IC—AT88RF001 Datasheet, Rev. 1943F-RFID-04/02," Copyright Atmel Corporation 2002.
"Read/Write Crypto Transponder for Short Cycle Time—TK5561A-PP Datasheet, 4682D-RFID-09/06," Copyright 2006 Atmel Corporation.

(Continued)

*Primary Examiner* — Daniel Wu
*Assistant Examiner* — Son M Tang
(74) *Attorney, Agent, or Firm* — Edell, Shapiro & Finnan, LLC

(57) ABSTRACT

A method and system for remotely configuring and/or provisioning a device that is nonoperational is provided. The device may be, in general, any electronic device that includes at least one setting ("device setting") that can be programmatically or otherwise established or adjusted to configure and/or provision the device for its operation. The method includes detecting, via a radio frequency identification ("RFID") tag, a state of a device that is communicatively coupled to the RFID tag; and providing the device setting via the RFID tag when the state signifies that the device is nonoperational.

53 Claims, 8 Drawing Sheets

U.S. PATENT DOCUMENTS

| | | | |
|---|---|---|---|
| 2005/0227669 A1* | 10/2005 | Haparnas | 455/410 |
| 2006/0015752 A1 | 1/2006 | Krueger | |
| 2006/0174319 A1* | 8/2006 | Kraemer et al. | 726/1 |
| 2006/0258289 A1* | 11/2006 | Dua | 455/41.3 |
| 2007/0143162 A1* | 6/2007 | Keever et al. | 705/7 |
| 2007/0265984 A1* | 11/2007 | Santhana | 705/65 |
| 2007/0282747 A1 | 12/2007 | Shen et al. | |
| 2008/0041930 A1* | 2/2008 | Smith et al. | 235/375 |
| 2008/0077632 A1* | 3/2008 | Tysowski et al. | 707/204 |
| 2008/0155262 A1* | 6/2008 | Beaver et al. | 713/173 |
| 2008/0157925 A1* | 7/2008 | Batra | 340/10.1 |

OTHER PUBLICATIONS

"RF Identification RFID—Innovative Silicon IDIC Solutions Brochure," Copyright 2007 Atmel Corporation.

"Standard Read/Write ID Transponder with Anti-collision—TK5551 Datasheet, 4709F-RFID-06/06," Copyright 2006 Atmel Corporation.

"RFID Application Kit TMEB8704 Application Note, Rev. 4781A-RFID-10/05," Copyright Atmel Corporation 2005.

"RFID Reader Module (#28140) Datasheet," Parallax, Inc., Updated Sep. 2005.

* cited by examiner

METHOD AND SYSTEM FOR REMOTELY PROVISIONING AND/OR CONFIGURING A DEVICE

CROSS-REFERENCE TO RELATED APPLICATIONS

This application is a continuation-in-part application of U.S. patent application Ser. No. 11/656,660, filed 22, Jan. 2007, entitled: "Remote Inventory of Devices", which is incorporated herein by reference.

BACKGROUND

1. Field

The present invention relates to remotely provisioning and/or configuring a device.

2. Related Art

In the non-so-distant past, electronic devices included dedicated hardware, firmware and/or software and configuring and/or provisioning such devices was performed by setting switches and/or loading hardware with software that was previously preconfigured. More recently, next generation and newer types of the electronic devices, such as networking equipment, mobile phones, sensors, global-positioning system and other satellite-signal receivers, electronic-control modules for automobiles and other automobile electronics, cable television receivers, analog and/or digital video players/recorders, computers, etc., include one or more settings ("device settings") that can be programmatically or otherwise established or adjusted to configure and/or provision the devices for their operation.

A drawback to, but a perquisite for, programmatically or otherwise establishing or adjusting (collectively "setting") the device settings is that the devices had to be powered on, and generally, operational. In many cases, this required that the devices had to be (i) unpackaged from their shipping cartons, (ii) electrically coupled to a source of power, and then (iii) accessed through a configuration utility program. Once accessed, then the configuration utility program could be used to set the device settings. While effective, this legacy process and supporting architecture has several drawbacks.

For instance, the legacy process and supporting architecture requires an operator (man or machine) to physically contact or otherwise physically couple to (e.g., plug a cable into) the devices to gain access to and/or power the devices for configuration and/or provisioning. This can be awfully problematic when obtaining physical access to the devices is impossible or seemingly impossible, inconvenient, not advisable, bothersome, difficult, and/or hindered, such as when the devices are partially or completely limited, obstructed, impeded and/or blocked. This includes, for example, when the devices are partially or completely positioned within, attached to or otherwise disposed in or on a support structure, such as a chassis ("device chassis") to which the device interfaces and/or a box, container or other vessel (collectively "container"), which may partially or completely envelope the device.

Because of having to physically contact or otherwise physically couple to the devices, the legacy process and supporting architecture requires that the devices have to be removed or disassembled from the support structures to gain access to, and in turn, configure and/or provision the devices. For example, the legacy process and supporting architecture may require that (i) the devices be dismounted from the device chassis, (ii) some or the entire device chassis be disassembled (including removing and/or dismounting other devices that may be contained therein), (iii) the devices be un-packaged from their containers (e.g., shipping containers), and/or (iv) the containers be dismantled. As such, the legacy process and supporting architecture cannot be suitably deployed in, for example, most any manufacturing, warehousing and shipping, retail, corporate, etc. environment.

SUMMARY

A method and system for remotely configuring and/or provisioning a device that is nonoperational is provided. The device may be nonoperational when, for example, the device (as a whole and/or some portion thereof) is unpowered or otherwise powered off or when the device (as a whole or some portion thereof) is not operating, inactive, disabled, interrupted, inhibited from being available to operate or otherwise not operational. The method includes detecting, via a radio frequency identification ("RFID") tag, a state of a device that is communicatively coupled to the RFID tag; and providing a setting to the device via the RFID tag when the state signifies that the device is nonoperational.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

Overview

Figure 1:
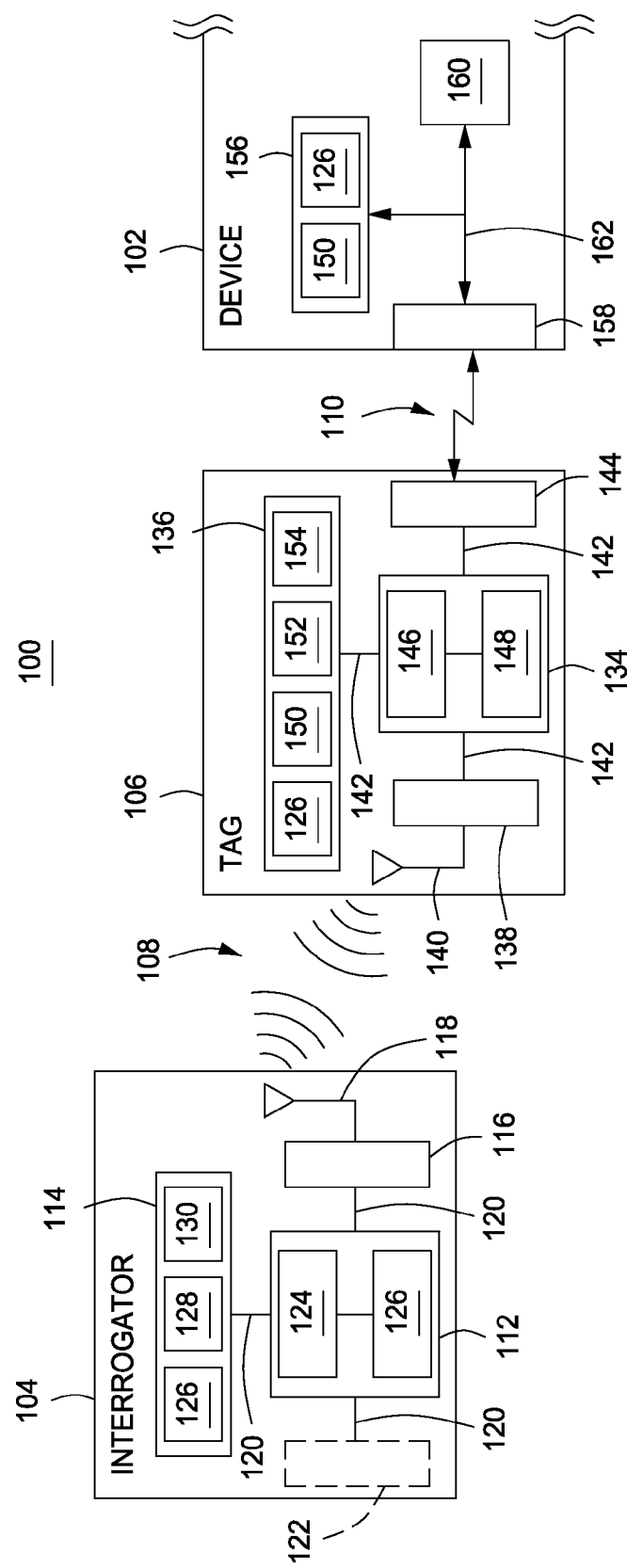
FIG. 1 is a block diagram illustrating an example system for remotely configuring and/or provisioning a device when the device is nonoperational.

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments and/or examples disclosed are for exemplary purposes only and other embodiments and/or examples may be employed in lieu of or in combination with of the embodiments disclosed.

As summarized above and described in more detail below, a method and system for remotely configuring and/or provisioning a device that is nonoperational is provided. This device may be, in general, any electronic device that includes one or more settings ("device settings") that can be programmatically or otherwise established or adjusted to configure and/or provision the device for its operation. Examples of the device include networking equipment, mobile phones, sensors, global-positioning system and other satellite-signal receivers, electronic-control modules for automobiles and other automobile electronics, cable television receivers, analog and/or digital video players/recorders, computers, etc. Other examples of the device are described in the above-incorporated U.S. patent application Ser. No. 11/656,660.

The device settings may be used by the device to carry out one or more of its functions ("device functions") when the device is under operation, active, available for operation or otherwise operational. Examples of the device settings include parameters, rules, variables, expressions, templates, characteristics, directives, commands, fields, references to services, etc.

As noted above, the present method and system are advantageously adapted to remotely configure and/or provision the device when it is nonoperational. The device may be nonoperational when, for example, the device (as a whole and/or some portion thereof) is unpowered or otherwise powered off or when the device (as a whole or some portion thereof) is not operating, inactive, disabled, interrupted, inhibited from being available to operate or otherwise not operational. This includes, of course, when one or more of the device functions are powered off, not operating, inactive, disabled, interrupted, inhibited from being available to operate or otherwise not operational.

Because of being adapted to remotely configure and/or provision the device, the method and system may configure and/or provision the device without having an operator (man or machine) physically contact or otherwise physically couple to (e.g., plug a cable into) the device to gain access to and/or power the device. This is extremely beneficial when obtaining physical access to the device is impossible or seemingly impossible, inconvenient, not advisable, bothersome, difficult, and/or hindered, such as when the device is partially or completely limited, obstructed, impeded and/or blocked. This includes, for example, when the device is partially or completely positioned within, attached to or otherwise disposed in or on a support structure.

Examples of such support structure include a chassis ("device chassis") to which the device interfaces and/or a box, container or other vessel (collectively "container"), which may partially or completely envelope the device. In addition, the support structure may be, for example, used for storing the device, shipping or otherwise transporting the device from a supplier (e.g., a manufacturer, jobber, retailer, etc.) to a recipient (e.g., a warehouse, jobber, retailer, service provider, end user, etc.).

Because of not having to physically contact or otherwise physically couple to the device, the method and system may be adapted to configure and/or provision the device without having to remove the device from the support structure or disassemble the support structure to gain access to the device. For example, the method and system may be adapted to configure and/or provision the device without having to (i) dismount the device from the device chassis, (ii) disassemble some or the entire device chassis (including removing and/or dismounting other devices that may be contained therein), (iii) un-package the device from the container, and/or (iv) dismantle the some or the entire container. As such, the method and system may be beneficially deployed in, for example, most any manufacturing, warehousing and shipping, retail, corporate, etc. environment.

To remotely configure and/or provision the device, the method and system are adapted to ascertain, determine, discover or otherwise detect (collectively "detect"), via a radio-frequency-identification ("RFID") tag, a state of the device ("device state"), and when the device state signifies that the device is nonoperational ("nonoperational state"), then provide to the device, via the RFID tag, one or more of the device settings. Because of readily apparent security and power conservation reasons, the RFID tag, in some instances, may be adapted to employ one or more security policies to limit access to (and, in turn, configuring and/or provisioning) the device. These security policies may be based, for example, on the device state. If, for example, the device state signifies that the device is operational, then the RFID tag may prevent access to and, in turn, configuration and/or provisioning of the device. If, on the other hand, the device state signifies that the device is in the nonoperational state, then the RFID tag may require that a provider of the device settings provide, in accordance with the security policies, one or more credentials for authentication.

Alternatively, the RFID tag may be adapted to employ, in accordance with the security policies, different levels of security based on the nonoperational state. For example, the RFID tag may be adapted to employ, in accordance with the security policies, a first level of security ("first security level") when the nonoperational state signifies that the device is unpowered, and a second level of security ("second security level") when the nonoperational state signifies that the device is powered, but otherwise nonoperational. In some instances, the first security level may be less secure than the second security level.

Example Architecture

FIG. 1 is a block diagram illustrating an example system 100 for remotely configuring and/or provisioning a device, such as device 102, when it is nonoperational. The system 100 includes an RFID interrogator 104 and an RFID tag 106. The device 102, like the device noted above and described in more detail below, may be any electronic device that includes one or more device settings that can be programmatically or otherwise established or adjusted (collectively "set") to configure and/or provision the device 102 for its operation. Like above, the device 102 may be partially or completely positioned within, attached to or otherwise disposed in or on the support structure (not shown).

To facilitate configuring and/or provisioning the device 102, the RFID interrogator 104, the RFID tag 106 and the device 102 may be adapted to establish, maintain and/or sustain (collectively "establish") communications to one another via one or more communication links. The RFID interrogator 104 and the RFID tag 106 may be adapted to establish a first communication via a first communication link 108, and the RFID tag 106 and the device 102 may be adapted to establish a second communication via a second communication link 110. Through these first and second communications, the RFID interrogator 104, the RFID tag 106 and the device 102 may exchange information, such as the device state, the device settings, credentials, etc., as noted above and/or described in more detail below.

The RFID interrogator 104 may include a number of elements, many of which are not shown for simplicity of exposition. The RFID interrogator 104 may be formed as or in a single unitary device and concentrated on a single server, client, peer or other type node. Alternatively, the RFID interrogator 104 may be formed in or from one or more separate devices, and as such, may be distributed among a number of server, client, peer or other type nodes. The RFID interrogator 104 may be scalable (i.e., may employ scale-up and/or scale-out approaches). In addition, the RFID interrogator 104 may be a handheld device or integrated into another apparatus.

As shown, the RFID interrogator 104 includes logic 112, memory 114, a radio-frequency ("RF") transceiver 116 and an antenna 118; some or all of which may be coupled together via one or more communication links 120. The RFID interrogator 104 may also include, as an option, an input/output ("I/O interface") 122 for communicating with a source of data external to the RFID interrogator 104 ("external-data source"); not shown.

The logic 112 is operable to control, manipulate or otherwise interact with the memory 114, RF transceiver 116, and/or the I/O interface 122 via the respective communication links 120. The logic 112 may include one or more processing units (collectively "processor") 124 and support circuits 126. The processor 124 may be one or more conventional processors, microprocessors, multi-core processors and/or microcontrollers. The support circuits 126 facilitate operation of the processor 124 and may include well-known circuitry or circuits, including, for example, an I/O interface; cache; clock circuits; power supplies; and the like.

The memory 114 may store and/or receive requests from the processor 124 to obtain the device settings 126 that can set to configure and/or provision the device 102 for its operation. In addition, the memory 112 may store and/or receive requests from the processor 124 to obtain various software packages, such as an operating system 128 and software for causing the RFID tag 106 to program the device ("tag-instruction software 130").

The memory 114 may also store and receive requests from the processor 122 to obtain operands, operators, dimensional values, configurations, and other data that are used by the operating system 128 and the tag-instruction software 130 to control operation of and/or to facilitate performing the functions of the RFID interrogator 104. To facilitate the foregoing, the memory 114 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like.

The communication links 118 provide for transmissions of analog or digital information among the logic 112, the memory 114, the RF transceiver 116 and other portions of the RFID interrogator 104 (shown and not shown). The I/O interface 122 is adapted to control transmissions of information, such as the device settings 126, between (shown and not shown) elements of the RFID interrogator 104, such as the logic 112 and the memory 114.

In addition, the I/O interface 122 is adapted to control transmissions of information, such as the device settings 126, between elements of the RFID interrogator 104, the external-data source and other I/O devices disposed within, associated with or otherwise attached or coupled to the RFID interrogator 104. Examples of the I/O devices include (i) a monitor, (ii) any or any combination of storage devices, including but not limited to, a tape drive, a floppy drive, a hard disk drive or a compact disk drive, (iii) a receiver and/or a transmitter, (iv) a speaker, (v) a display, (vi) a speech synthesizer, (vii) an output port, and (viii) the like.

The operating system 128 may include code for operating the RFID interrogator 104 and for providing a platform onto which the tag-instruction software 130 can be executed. The tag-instruction software 130 may be in any of a standalone, client/server, peer-to-peer and other format, and may include code for facilitating the remote configuring and/or provisioning of the device 102.

The tag-instruction software 130 may include, for example, code for programmatically or otherwise establishing or adjusting the RFID tag 104 so as to cause it to configure and/or provision the device 102 for its operation. This code may be adapted to control, manipulate or otherwise interact with the RF transceiver 116 to cause it to establish the first communication with the RFID tag 106, via communication link 108. Through this first communication, the RFID interrogator 104 may inventory, access and/or exchange the device settings 126 with the RFID tag 106. In addition, the code may cause the RF transceiver 116 to instruct or otherwise cause the RFID tag 106 to establish, via a second communication link 110, the second communication with the device 102.

The RF transceiver 116 may be adapted to operate in accordance with EPC™ Radio-Frequency Identity Protocols Class-1 Generation-2 UHF RFID Protocol for Communications at 860 MHz-960 MHz Version 1.1.0, EPC Global Inc., 2006; which is incorporated herein by reference in its entirety. The RF transceiver 116 may be adapted to operate in accordance with other communication protocols as well.

The RF transceiver 116 and the tag-instruction software 130 may be adapted to operate in accordance with one or more security protocols that are compatible with the RFID tag 106. Using these security protocols, the RF transceiver 116 and the tag-instruction software 130 are operable to cause the RFID interrogator 104 to substantiate its identity, and in turn, receive authorization to access the RFID tag 106.

To establish the first communication link 108, and in turn, the first communication, the RF transceiver 116 may broadcast or otherwise emit out antenna 132 one or more outbound RF signals and receive back from the RFID tag 106, via the antenna 132, one or more inbound RF signals. These signals may have be low frequency ("LF"), high frequency ("HF"), ultra-high frequency ("UHF"), etc.

Although RFID interrogator 104 is generally located remotely and physically separate from the RFID tag 104, the device 102 and/or the support structure, the RFID interrogator 104 may be positioned or otherwise located in close enough proximity to the (i) RFID tag 106, (ii) device 102 and/or (iii) support structure so as to allow the outbound-RF signals to radiate to RFID tag 106. Alternatively, the RFID tag 104, the device 102 and/or the support structure may be positioned or otherwise located in close enough proximity to the RFID interrogator 104 so as to allow the outbound-RF signals to radiate to RFID tag 106.

The outbound RF signals may include two types of RF signals, namely, (i) modulated-RF signals for providing the device settings 126 and/or other information to the RFID tag 106 and (ii) unmodulated-RF signals for causing the RFID tag 106 to provide information back to the RFID interrogator 104. In general, the modulated-RF signal includes a carrier that may be modulated with one or more outbound commands for inventorying, accessing and/or otherwise interacting with the RFID tag 104. These outbound commands, which may be sent to the RFID tag 104 in accordance with execution of the tag-instruction software 130, may include one or more commands for transferring the device settings 126 and/or other information from the RFID interrogator to the RFID tag 106, and in turn, to the device 102.

The inbound RF signals may include one or more modulated-RF signals that are formed by the RFID tag 106 modulating the unmodulated-RF signals ("tag-modulated signals") with one or more inbound commands and backscattering the tag-modulated-RF signals to the RFID interrogator 104. These inbound commands, which the tag-instruction software 130 may expect to receive, may include one or more commands for transferring from the RFID tag 106 information, such as device state 150.

The RFID tag 106, like the RFID interrogator 104, may include a number of elements, many of which are not shown for simplicity of exposition. In general, the RFID tag 106 is formed from and/or is adapted operate in accordance with some or all functions carried out by any type (e.g., passive, active, or semi-passive) of RFID tag. To facilitate this, the RFID tag 106 is generally formed as or in a single unitary device and concentrated on a single server, client, peer or other type node. The RFID tag 106, however, may be formed in or from one or more separate devices, and as such, may be distributed among a number of server, client, peer or other type nodes. As described in more detail below, the RFID tag 106 may be integrated, disposed onto or otherwise incorporated into the device 102 and/or the support structure.

As shown, the RFID tag 106 includes logic 134, memory 136, an RF transceiver 138, an antenna 140 and an I/O interface 144; some or all of which may be coupled together via one or more communication links 142. The logic 134 is operable to control, manipulate or otherwise interact with the memory 136, the RF transceiver 138, and/or the I/O interface 144 via the respective communication links 144.

The logic 134 may include one or more processing units (collectively "processor") 146 and support circuits 148. The processor 146 may be one or more conventional processors, microprocessors, multi-core processors and/or microcontrollers. The support circuits 148 facilitate operation of the processor 144 and may include well-known circuitry or circuits, including, for example, an I/O interface; cache; clock circuits; power supplies; and the like.

The memory 136 may store and/or receive requests from the processor 144 to obtain the device settings 126 that are transferred from the RFID interrogator 104, and/or the device state 150. In addition, the memory 136 may store and/or receive requests from the processor 144 to obtain various software packages, such as an operating system 152 and software for programming the device ("device-programming software 154").

The memory 136 may also store and receive requests from the processor 146 to obtain operands, operators, dimensional values, configurations, and other data that are used by the operating system 152 and the device-programming software 154 to control operation of and/or to facilitate performing the functions of the RFID tag 106. To facilitate the foregoing, the memory 136 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like.

The communication links 142 provide for transmissions of analog or digital information among the logic 134, the memory 136, RF transceiver 138 and other portions of the RFID tag 106 (shown and not shown). The I/O interface 144 is adapted to control transmissions of information, such as the device settings 126 and the device state 150, between (shown and not shown) elements of the RFID tag 106, such as the logic 134 and the memory 136. In addition, the I/O interface 144 is adapted to control transmissions of information, such as the device settings 126 and the device state 150, between the RFID tag 104 and the device 102.

The operating system 152 may include code for operating the RFID tag 104 and for providing a platform onto which the device-programming software 154 can be executed. The device-programming software 154 is generally in a standalone format, and includes code for facilitating the remote configuring and/or provisioning of the device 102. Alternatively, the device-programming software 154 may be in any of a server, client, peer-to-peer and other format (e.g., when the RFID tag 104 is distributed among more than one node).

The device-programming software 154 may include, for example, code for programmatically or otherwise establishing or adjusting the device 102 so as to configure and/or provision the device 102 for its operation. This code may be adapted to control, manipulate or otherwise interact with the RF transceiver 138 to cause it to establish the first communication with the RFID interrogator 104, via communication link 108. As noted, the RFID tag 104 and the RFID interrogator 104 may exchange, via the first communication, the device settings 126 and/or the device state 150. In addition, the code may be adapted to cause the RF transceiver 138 to cause the RFID tag 106 to establish, via a second communication link 110, the second communication with the device 102.

The RF transceiver 138 may be adapted to operate in accordance with the above-incorporated EPC™ Radio-Frequency Identity Protocols Class-1 Generation-2 UHF RFID Protocol for Communications at 860 MHz-960 MHz Version 1.1.0, EPC Global Inc., 2006. The RF transceiver 138 may be adapted to operate with other communication protocols as well.

To establish the first communication link 108, and in turn, the first communication, the RF transceiver 138 may be adapted to (i) receive from the RFID interrogator 104 the modulated-RF signals, and where appropriate, (ii) backscatter out antenna 132 the tag-modulated-RF signals. In addition to receiving the outbound commands, the RF transceiver 138 may use the modulated-RF signals (e.g., extract electromagnetic energy contained therein) to power the RFID tag 106.

The RFID tag 106 may be adapted to use the power to establish the first and second communications. The RFID tag 106 may also be adapted to use and/or transmit the power to the device 102 so as to set the device settings 126 when the device 102, as a whole or portions thereof, are otherwise unpowered. As an alternative, the device 102 may be adapted to obtain the modulated-RF and/or unmodulated-RF signals and extract the electromagnetic energy contained therein for powering the device 102 to allow the device settings 126 to be set when the device 102, as a whole or portions thereof, are otherwise unpowered.

Although RFID tag 106 is generally located remotely and physically separate from the RFID interrogator 104, the RFID tag 106 may be positioned or otherwise located in close enough proximity to the RFID interrogator 104 so as to allow the tag-modulated-RF signals to radiate to RFID interrogator 104. In addition, the RFID tag 104, in general, is positioned proximate and/or affixed to the device 102 and/or the support structure. Alternatively, the RFID tag 104 may be positioned or otherwise located in close enough proximity to the device 102 so as to allow for exchange, via the second communication link 110, of the device settings 126, and if obtained from the device, the device state 150.

The second communication link 110 may be, for example, a wiring harness or other wired or wireless link that allows the RFID tag 106 to be physically separate from the device 102 and/or support structure, yet exchange with the device 102 the device settings 126, and if appropriate, the device state 150. As an alternative, the second communication link 110 may be a bus, ribbon cable or other wired or wireless link that allows the RFID tag 106 to be disposed on or proximate to the device 102 and/or support structure. The second communication link 110 may take other forms as well. In addition, the second communication link 110 may be adapted to communicate according to one or more protocols for communicating serially, in parallel, asynchronously, synchronously, etc.

In addition to being adapted to interact with the I/O interface 144 to establish the second communication, the device-programming software 154 may include code that is adapted to prevent or inhibit setting the device settings 126 unless the device 102 is nonoperational. To facilitate determining whether the device 102 is nonoperational, the device-programming software 154 may include code adapted to obtain the device state 150 from the device 102, via the second communication.

Alternatively, the device-programming software 154 may include code adapted to determine the device state 150 by way of an evaluation of the device 102. For example, the code may be adapted to deduce the device state 150 by polling, monitoring and/or examining the device 102 for indicators of the device state 150 ("device-state indicators"). These device-state indicators include, for example, an indicator signifying that the device 102 is powered or unpowered, an indicator signifying that one or more interfaces of the device 102 (shown and not shown) are operational or nonoperational, etc. This code may set the device state 150 to signify that the device 102 is nonoperational responsive to deducing that the device state indicators signify that the device 102 is nonoperational.

The device-programming software 154 may also include code that is adapted to employ the security policies to limit setting the device settings 126. This code may, for example, request that the RFID interrogator 106 provide, in accordance with the security policies, one or more credentials for authentication ("authentication credentials").

Alternatively, the code may be adapted to employ, in accordance with the security policies, the different security levels based on the nonoperational state. The security levels may be hierarchal in terms of requiring, from one of security levels (i.e., a lower security level) to another of the security level (i.e., a higher security level), additional constraints for establishing the first communication with and/or gaining access to the RFID tag 106. The security policies may define, for example, three security levels, namely, a first security level, a second security level and a third security level. The first security level may have less constraints (i.e., be less secure) than the second security level, which may have less constraints (i.e., be less secure) than the third security level.

By way of example, the first security level may not require that the RFID interrogator 104 provide the authentication credentials. The second security level may require that RFID interrogator 104 provide a user name and/or password as the authentication credentials. The third security level may require that the authentication credentials provided by the RFID interrogator 104 be substantiated by a third party (e.g., a certification authority).

The code may be adapted to employ the security levels as a function of the nonoperational state. For example, the RFID tag 104 may be adapted to employ (i) the first security level when the nonoperational state signifies that the device 102 is unpowered; and (ii) the second or third security levels when the nonoperational state signifies that the device 102 is powered, but otherwise non-operational. The code may also be adapted to employ other security levels when the nonoperational state signifies that the device 102 is operational. While three security levels are discussed herein, the security policies may define any number of security levels.

The device 102 may include a number of elements, many of which are not shown for simplicity of exposition. As shown, the device 102 includes a memory 156, I/O interface 158, and logic 160, which are communicatively coupled via a bus or other type of communication link 162.

The memory 156 may store the device settings 126 that are transferred from the RFID interrogator 104 and the device state 150 as provided by the device 102. The memory 156 may be or employ random access memory ("RAM") and variations thereof, such as non-volatile RAM, optical storage, magnetic storage, removable storage, erasable programmable read only memory and variations thereof, content addressable memory and variations thereof, flash memory, disk drive storage, any combination thereof, and the like.

The I/O interface 158 may be adapted to process and respond to requests from the RFID tag 106 and/or the RFID interrogator 104 for the device state 126, including providing the device state 126 to the RFID tag 106 and/or the RFID interrogator 104. In addition, the I/O interface 158 may be adapted to provide the device settings 126 to the memory 156. The I/O interface 156 may be adapted to do so using direct memory access or other memory access mechanism. Additionally, the I/O interface 156 may facilitate carrying out the second communications using communication and security protocols compatible with second communication link 110.

The logic 160, in general, controls and/or monitors the operation of the device 102. This logic 160 may be adapted to store the device state 150 in the memory 156. Alternatively, the logic 160 may be adapted to determine the device state 150 on-the-fly and report the device state 150 to the I/O interface 158. The logic 160 may do so responsive to the I/O interface 158 requesting the device state 150.

Example Operation

Figure 2:
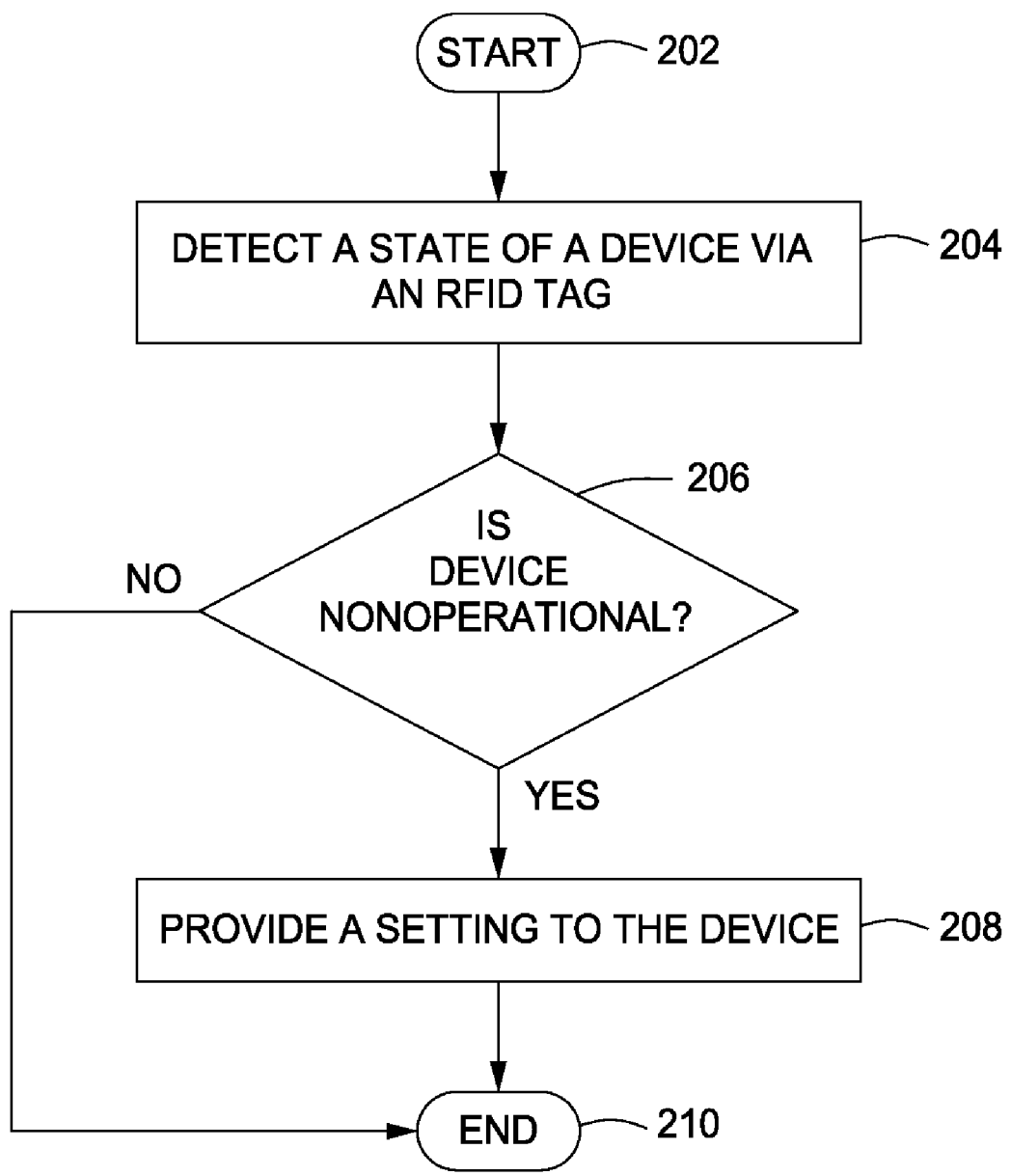
FIG. 2 is a flow diagram illustrating an example flow for configuring and/or provisioning a device when the device is nonoperational.

Referring now to FIG. 2, a flow diagram illustrating an example flow 200 for configuring and/or provisioning a device is shown. For convenience, the flow 200 is described with reference to the system 100 of FIG. 1. The flow 200 may be carried out using other architectures as well. For ease of exposition, the following uses possessive form with respect to the RFID interrogator 104, the RFID tag 106 and/or the device 102 so as to differentiate the elements of thereof.

The flow 200 begins at termination block 202, and then transitions to process block 204. As shown in process block 204, the device state 150 is detected via (e.g., using, by the use of, by way of, through, by, etc.) the RFID tag 106. In some instances, the RFID tag 106 may detect the device state 150, and in other instances, the RFID interrogator 106 may detect the device state 150 by way of the RFID tag 106. In the former, the RFID tag 106 operates autonomously or substantially autonomously from the RFID interrogator 104 when detecting the device state 150. In the latter, RFID interrogator 104 substantially controls or otherwise causes the RFID tag 106 to operate under its control when detecting the device state 150.

The RFID tag 106 may operate autonomously when, for example, it is formed from and/or is adapted operate in accordance with some or all functions carried out by an active or semi-passive or other powered type of RFID tag, and when the tag's logic 134 and/or the device-programming software 154 are adapted to carry out the detection. In this mode ("autonomous mode"), the RFID tag 106 may carry out the detection at any time and/or without obtaining power or receiving a request for the device state 150 ("device-state request") from the RFID interrogator 104. This way, the RFID tag 106 may maintain the device state 150 in the tag's memory 136, which allows it to provide the device state 150 upon receiving the device-state request.

The RFID tag 106 may operate substantially autonomously when, for example, it is formed from and/or is adapted operate in accordance with some or all functions carried out by any type of RFID tag, and when the tag's logic 134 and/or the device-programming software 154 are adapted to carry out the detection. In this mode ("semi-autonomous mode"), the RFID tag 106 may carry out the detection responsive to obtaining power from and/or receiving the device-state or other request from the RFID interrogator 104. Additionally, the RFID tag 106 may carry out the detection in the semi-autonomous mode responsive to receiving from the RFID interrogator 104 an instruction, command, trigger for causing the RFID tag 106 to carry out the detection.

The RFID interrogator 104 may substantially control or cause the RFID tag 106 to operate under its control when, for example, the tag's logic 134 and/or the device-programming software 154 are not adapted to carry out the detection in accordance with the autonomous or semi-autonomous modes. In this mode ("host-controlled mode"), the RFID interrogator 104 may use the RFID tag 106 as a conduit to the device 102. This may be carried out, for example, by the RFID interrogator 104 and the RFID tag 106 entering a master/slave relationship or otherwise causing the RFID tag 106 to carry out instructions that the RFID interrogator 104 broadcasts, emits or otherwise transmits (collectively "transmits").

To facilitate the host-controlled mode and/or the semi-autonomous mode, the RFID interrogator 104 and the RFID tag 106 may establish the first communication via the first communication link 108. To facilitate establishing the first communication, the RFID interrogator 104 is placed or otherwise located in close enough proximity to the (i) RFID tag 106, (ii) device 102 and/or (iii) support structure (or vice versa) so as to allow (i) the outbound-RF signals transmitted from the interrogator's RF transceiver 116 to radiate to the tag's antenna 140, and/or (ii) the inbound-RF signals backscattered from the tag's transceiver 138 to radiate to the interrogator's antenna 118.

During the first communication, the RFID interrogator 104 may carry out an inventorying session with the RFID tag 106. This inventorying session may be carried out in accordance with Appendix E of above-incorporated EPC™ Radio-Frequency Identity Protocols Class-1 Generation-2 UHF RFID Protocol for Communications at 860 MHz-960 MHz Version 1.1.0, EPC Global Inc., 2006. As part of the inventorying session, the interrogator's RF transceiver 116 transmits, via the modulated-RF signals, information for causing the RFID tag 106 to (i) energize (if not otherwise powered), and (ii) enter a state that indicates that the RFID interrogator 104 and the RFID tag 106 are securely partnered and that the RFID tag 106 grants access to the RFID interrogator 104 ("secured state"). As an alternative to the inventorying session when operating in the semi-autonomous mode, the interrogator's RF transceiver 116 may simply transmit, via the modulated-RF signals, information for causing the RFID tag 106 to energize.

After being energized or after entering the secured state, the tag's logic 134 may interrogate the device 102. In the host-controlled mode, the tag's logic 134 and/or the device-programming software 154 operate under control of the tag-instruction software 130. In the semi-autonomous mode, the tag's logic 134 operates under control of the device-programming software 154, and may interrogate the device 102 in response to receiving the device-state request or at any time after energizing. In the autonomous mode, the tag's logic 134 operates under control of the device-programming software 154, and may interrogate the device 102 at any time.

To facilitate interrogating the device 102 in any mode, the tag's logic 134 establishes the second communication with the device 102, and if appropriate, transmits power to the device 102. After establishing the second communication, the tag's logic 134 may poll the device's I/O interface 158 for the device state 150 ("device-state poll"). Alternatively, the tag's logic 134 may transmit to the device's I/O interface 158 a query or other request for the device state 150 ("device-state query").

Responsive to the device-state poll/query, the device's I/O interface 158 accesses the device's memory 156 and obtains the device state 150. After obtaining the device state 150, the device's I/O interface 158 transmits to the tag's logic 134 a response to the device-state poll/query ("device-state response"), which includes the device state 150. The tag's logic 134, in turn, receives the device-state response and extracts the device state 150. After extraction, the tag's logic 134 stores the device state 150 in the tag's memory 136.

As an alternative to obtaining the device state 150 from the device's memory 156, the device's I/O interface 158 may transmit or relay the device-state poll/query to the device's logic 160. In response, the device's logic 160 may perform an evaluation of the device 102 to obtain the device state 150, and then transmit the device-state response to the device's I/O interface 160. The device's I/O interface 158 may transmit or relay the device-state response to the tag's logic 134. The tag's logic 134, in turn, receives the device-state response and extracts the device state 150. After extraction, the tag's logic 134 stores the device state 150 in the tag's memory 136.

As another alternative, the tag's logic 134 may detect the device state 150 by evaluating the device 102. The tag's logic 134 may, for example, poll, monitor and/or examine the device's I/O interface 158 for one or more of the device-state indicators. Responsive to polling, monitoring, and/or examining the device's I/O interface 158, the tag's logic 134 may store the device-state indicators in the tag's memory 136 as the device state 150.

After storing it in the tag's memory 136, the tag's logic 134 may cause the tag's RF transceiver 138 to transmit the device state 150 to the interrogator's antenna 118. This may be done responsive to the interrogator's transceiver 116 transmitting the device-state request to the RFID tag 106. In the semi-autonomous and/or autonomous modes, however, the device state 150 might not be transmitted to the RFID interrogator 104.

After detecting the device state 150, the process 200 may transition to decision block 206. At decision block 206, a determination is made as to whether the device 102 is non-operational.

Like above, the RFID tag 104 may operate in one of the autonomous, semi-autonomous, or host-controlled modes when making the determination. When operating in the host-control mode, the tag-instruction software 130 makes the determination. When operating in the autonomous mode, the device-programming software 154 makes the determination. When in the semi-autonomous mode either the tag-instruction software 130 or the device-programming software makes the determination.

To make the determination, the tag-instruction software 130 or the device-programming software 154, as appropriate, evaluates the device state 150. When the device state 150 signifies that the device 102 is nonoperational, the determination is answered affirmatively ("affirmative determination") and the process 200 transitions to process block 208. When, on the other hand, the device state 150 signifies that the device 102 is operational, then the determination is answered negatively and the process 200 transitions to termination block 210. If the device-programming software 154 makes the affirmative determination, then the tag's logic 134 may cause the tag's RF transceiver 138 to transmit to the interrogator's antenna 118 information ("nonoperational information") that indicates that (i) the device state 150 signifies that the device 102 is nonoperational or (ii) the device-programming software 154 has determined that the device state 150 signifies that the device 102 is nonoperational.

As shown in process block 208, the RFID interrogator 104 provides the device settings to the device 102 via the RFID tag 104. To facilitate this, the RFID interrogator 104 and the RFID tag 106 establish the first communication and carry out the inventorying session if they have not already done so. In addition to the inventorying session, the interrogator's RF transceiver 116 transmits to the tag's antenna 140 a command to set the device settings 126 ("device-setting command"). This device-setting command includes the device settings 126, which were obtained from the interrogator's memory 114.

Responsive to receiving the device-setting command, the device-programming software 154 causes the tag's logic 134 to extract the device settings 126 from the device-setting command. After extraction, the device-programming software 154 causes the tag's logic 134 to transmit the device settings 126 to the device's I/O interface 158. After receiving the device settings 126, the device's I/O interface 158 stores the device settings 126 in the device's memory 156.

At some point after the device settings 126 are stored in the device's memory 156, the RFID tag 106 and/or the device 102 tear down or otherwise end the second communication, and the RFID interrogator 104 and the RFID tag tear down or otherwise end the first communication. With the device settings 126 stored in the device's memory, the device 102 may use one or more the device settings during its operation.

After tearing down the first and second communications, the flow 200 may transition to termination block 210, at which point the flow 200 terminates. Alternatively, the flow 200 may be repeated periodically, in continuous fashion, or upon being triggered as a result of a condition, such as an addition, deletion or modification of one or more of the device settings. As another alternative, the one or more of the blocks 204-208 may be repeated periodically, in continuous fashion, or upon being triggered as a result of a condition, so as to cause additional configuring and/or provisioning of the device 102.

Figure 3A:
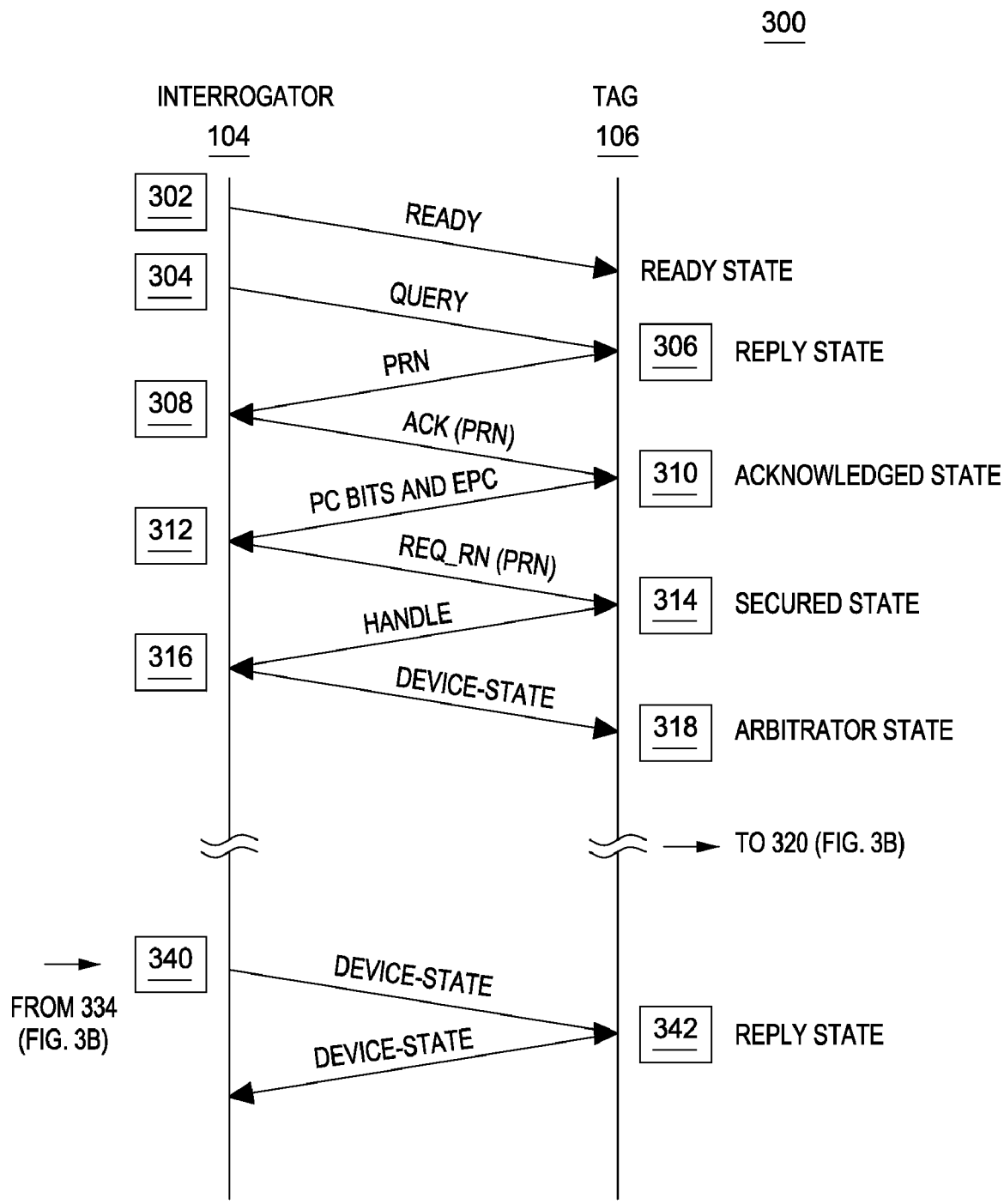
FIGS. 3A-3C are a flow diagram 300 illustrating an example communication flow for configuring and/or provisioning a device when the device is nonoperational.
Figure 3B:
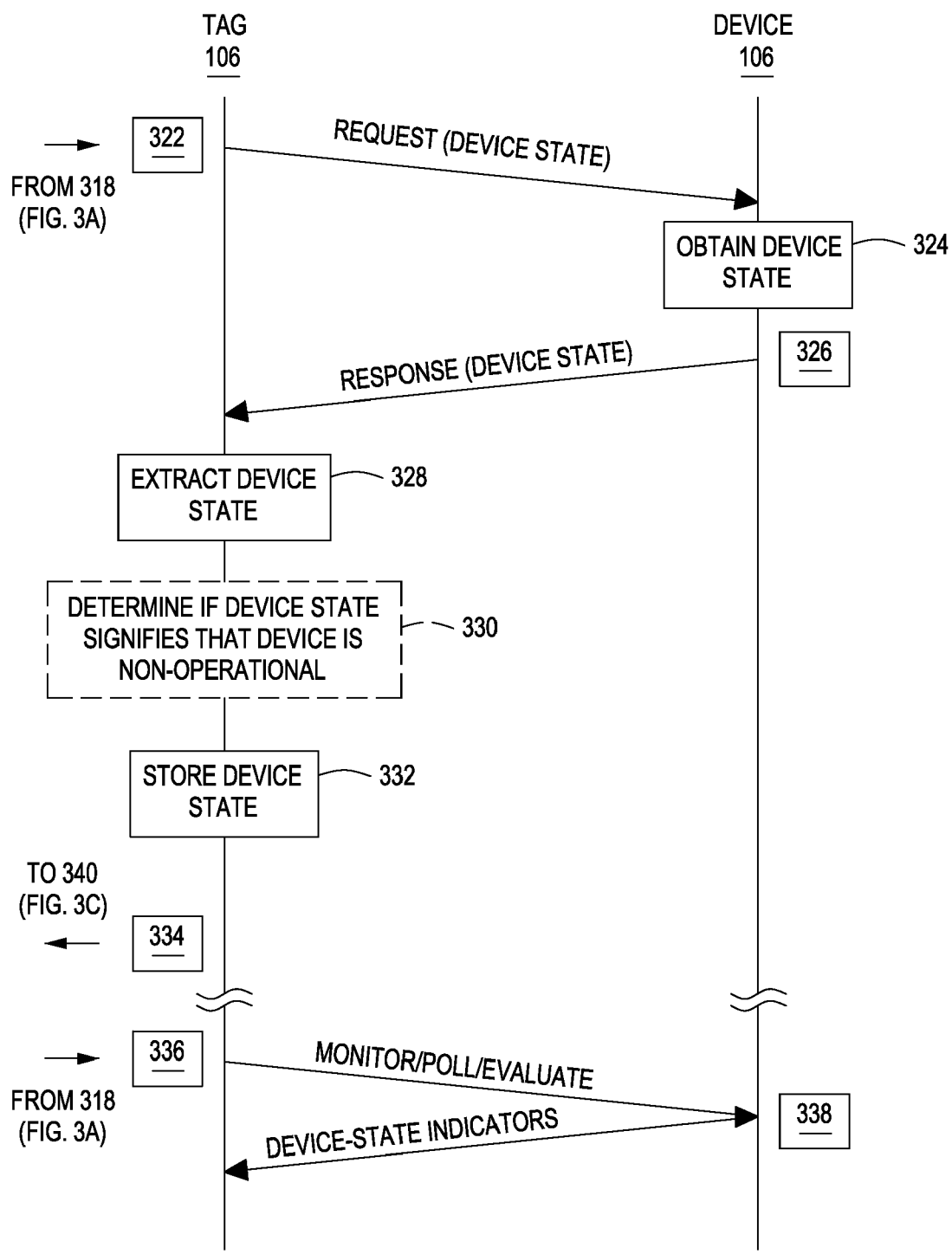
Figure 3C:
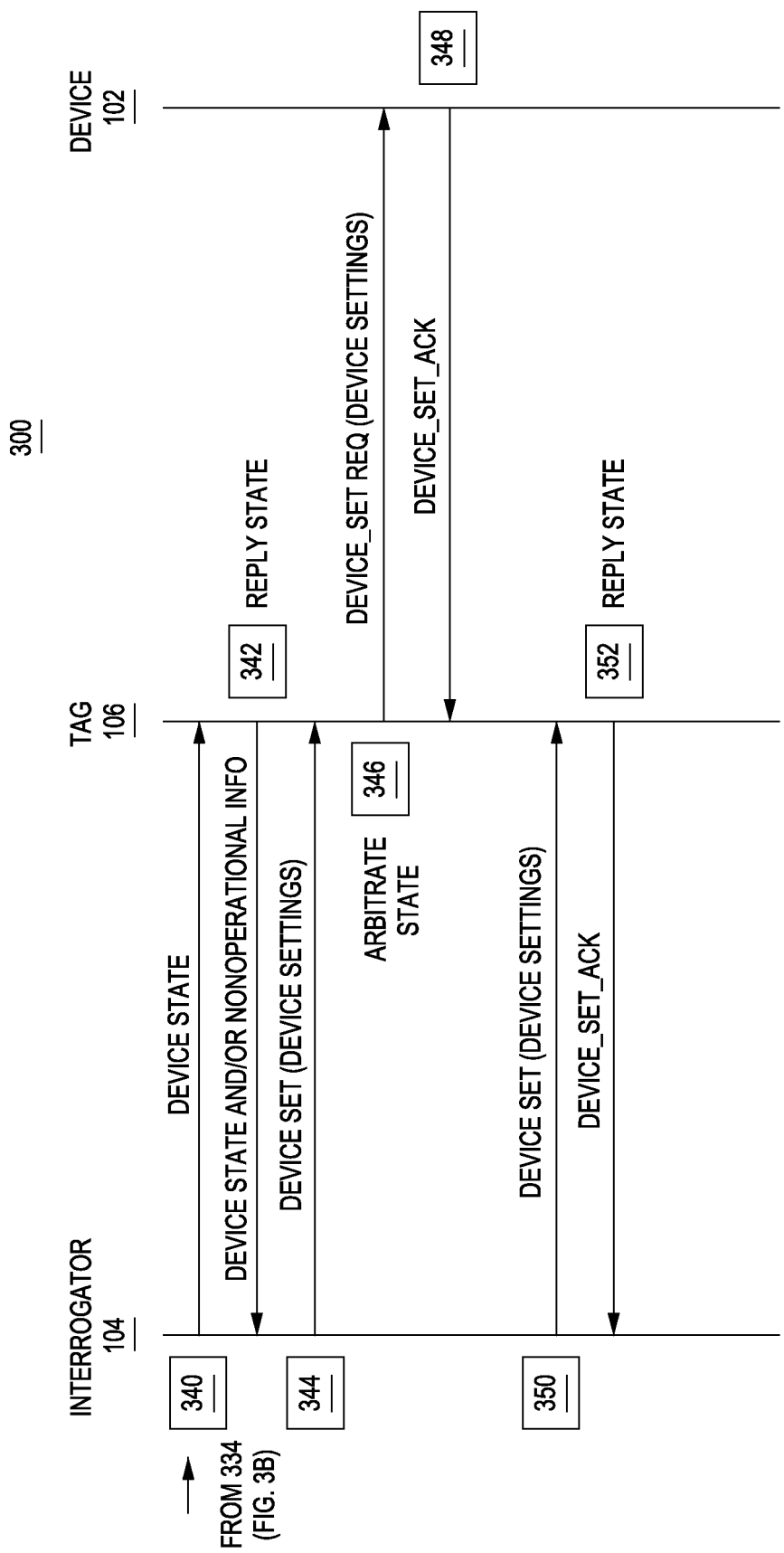

Referring now to FIGS. 3A-3C, a flow diagram 300 illustrating an example communication flow 300 for configuring and/or provisioning a device is shown. For convenience, the communication flow 300 is described with reference to the system 100 of FIG. 1. The communication flow 300 may be carried out using other architectures as well.

The flow 300 starts at flow indicator 302, at which point the RFID interrogator 104 has been placed or otherwise located in close enough proximity to the (I) RFID tag 106, (ii) device 102 and/or (iii) the support structure (or vice versa) so as to allow (i) the outbound-RF signals emitted from the interrogator's RF transceiver 116 to radiate to the tag's antenna 118, and (ii) the inbound-RF signals backscattered from the tag's transceiver 138 to radiate to the interrogator's antenna 140. At flow indicator 302, the interrogator's RF transceiver 116 transmits, via the modulated-RF signals, information for causing the RFID tag 106 to energize and enter a state that indicates that it is ready to communicate ("ready state").

After the RFID tag 106 energizes and enters the ready state, the interrogator's RF transceiver 116 transmits to the RFID tag 106, via the modulated-RF signals, a query command, as shown at flow indicator 304. Responsive to the query command, the RFID tag 106 may enter into a state that indicates that it will reply to the query command ("reply state").

At flow indicator 306, the tag's transceiver 138 transmits to the RFID interrogator 104, via the tag-modulated signals, a pseudorandom number ("PRN") associated therewith. In turn, the interrogator's RF transceiver 116 transmits to the RFID tag 106, via the modulated-RF signals, an acknowledge ("ACK") command, which acknowledges receipt of the PRN, as shown at flow indicator 308. The ACK command includes, as a parameter, the PRN. Responsive to the ACK command, the RFID tag 106 may enter into a state that indicates that it acknowledged the ACK command ("acknowledged state").

At flow indicator 310, the tag's transceiver 138 transmits to the RFID interrogator 104, via the tag-modulated-RF signals, protocol-control ("PC") bits and an electronic-product code ("EPC") associated therewith. The PC bits and the EPC may be defined in accordance with the above-incorporated EPC™ Radio-Frequency Identity Protocols Class-1 Generation-2 UHF RFID Protocol for Communications at 860 MHz-960 MHz Version 1.1.0, EPC Global Inc., 2006. The PC bits and EPC may be defined in other ways as well.

At flow indicator 312, the interrogator's RF transceiver 116 transmits to the RFID tag 106, via the modulated-RF signals, a request-for-PRN ("REQ_RN") command. The REQ_RN command may include, as a parameter, the PRN. Responsive to the REQ_RN command, the RFID tag 106 may enter into a state that indicates that the RFID interrogator 104 and the RFID tag 106 are securely partnered and that the RFID tag 106 grants access to the RFID interrogator 104 ("secured state").

At flow indicator 314, the tag's transceiver 138 transmits to the RFID interrogator 104, via the tag-modulated-RF signals, a handle associated therewith. The handle may be defined in accordance with the above-incorporated EPC™ Radio-Frequency Identity Protocols Class-1 Generation-2 UHF RFID Protocol for Communications at 860 MHz-960 MHz Version 1.1.0, EPC Global Inc., 2006. The handle may be defined in other ways as well.

After obtaining the handle, the interrogator's RF transceiver 116 may transmit to the RFID tag 106, via the modulated-RF signals, a command to cause the RFID tag 106 to establish the second communication and obtain the device state 150 ("device-state command"). Responsive to the device-state command, the RFID tag 106 enters a state that indicates that it on hold ("arbitrate state"), as shown at flow indicator 318.

Referring now to FIG. 3B, the communication flow 300 may transition to either flow indicator 322 or flow indicator 336 after entering the arbitrate state. At flow indicator 322, the tag's logic 134, under control of the device-programming software 154 or the tag-instruction software 130, as appropriate, transmits the device-state request to the device's I/O interface 158 via the tag's I/O interface 144. After flow indicator 322, the communication flow 300 may transition to process block 324. Alternatively, the communication flow 300 may transition to process block 330 or flow indicator 336 when the tag's logic 134 does not receive the device-state response from the device 102.

As shown in process block 324, the device's I/O interface 158 obtains the device state 150 from the device's memory 156. After process obtaining the device state, the device's I/O interface 158 transmits the device-state response, as indicated at the flow indicator 326. The device-programming software 154, in turn, extracts the device state 150 from the device-state response, as shown in process block 328. After process block 328, the communication flow 300 may transition to process block 332. Alternatively, the communication flow 300 may, optionally, transition to process block 330.

At process block 330, the device-programming software 154 may determine that the device state 150 signifies that the device 102 is nonoperational. The device-programming software 154 may do so by (i) evaluating whether device state 150 extracted from the device-state response signifies that the device 102 is nonoperational, or (ii) deducing that by not receiving the device-state response the device is unpowered or otherwise nonoperational and setting the device state 150 to signify that the device 102 is nonoperational.

As an alternative, the device-programming software 154 might not determine that the device state 150 extracted from the device-state response signifies that the device 102 is nonoperational. Instead, such determination may be made by the tag-instruction software 130 after transferring the device state 150 to the RFID interrogator 104.

After process block 330, the communication flow 300 may transition to process block 332. At process block 332, the tag's logic 134 stores the device state 150 in the tag's memory 136. Once stored, the RFID tag 106 is operable to transfer the device state 150 to the RFID interrogator 104.

After process block 332, the communication flow 300 may transition to flow indicator 334. If, the communication flow 300 transitioned to the flow indicator 336 instead of the flow indicator 322, then tag's logic 134 may poll, monitor and/or examine the device's I/O interface 158 for one or more of the device-state indicators. Responsively, the tag's logic 134 obtains the device-state indicators from the device's I/O interface 158 and processes them into the device state. After this, the communication flow 300 may transition to (i) the process blocks 330 or 332, and/or (ii) the flow indicator 334.

At flow indicator 334, the communication flow 300 may transition to flow indicator 340 (FIG. 3C). At flow indicator 340, the interrogator's RF transceiver 116 may transmit to the RFID tag 106, via the modulated-RF signals, a second device-state command. Responsive to the second device-state command, the RFID tag 106 may enter into the reply state, as shown at flow indicator 322.

After entering the reply state, the tag's logic 134 obtains the device state 150 from the tag's memory 136. In addition, the tag's transceiver 138 transmits the device state 150 to the RFID interrogator 104, via the tag-modulated-RF signals. Alternatively and/or additionally, the tag's transceiver 138 may transmit to the RFID interrogator 104, via the tag-modulated-RF signals, the nonoperational information. This way, the tag-instruction software 130 need not determine whether the device state 150 signifies that the device 102 is nonoperational.

After receiving the device state 150 and/or the nonoperational information or determining that the device state 150 signifies that the device 102 nonoperational, the interrogator's RF transceiver 116, via the modulated-RF signals, transmits to the tag's antenna 140 the device-setting command. Responsive to the device-setting command, the RFID tag 106 enters the arbitrate state, as shown at flow indicator 346.

After entering the arbitrate state, the device-programming software 154 causes the tag's logic 134 to transmit a request to set the device settings 126 ("device-setting request") or relay the device-setting command to the device's I/O interface 158. After receiving the device-setting request/command, the device's I/O interface 158 extracts the device settings 126 and stores them in the device's memory 156.

At flow indicator 348, the device's I/O interface 158 transmits an acknowledgement to the device-setting request/command ("device-set ACK"). After receiving the device-set ACK, the RFID tag 106 remains in the arbitrate state, but is prepared to enter the reply state. In addition, the device-programming software 154 may cause the tag's logic 134 to end the second communication.

At some point, the interrogator's RF transceiver 116 may transmit to the RFID tag 106, via the modulated-RF signals, a second device-setting command, as shown at flow indicator 350. Responsive to the second device-second command, the RFID tag 106 may enter into the reply state, as shown at flow indicator 352. After entering the reply state, the tag's transceiver 138 transmits or relays the device-set ACK to the RFID interrogator 104, via the tag-modulated-RF signals.

At some point after receiving device-set ACK, the RFID interrogator 104 and the RFID tag tear down the first communication. After tearing down the second communication, the communication flow 300 may terminate. Alternatively, the communication flow 300 may be repeated periodically, in continuous fashion, or upon being triggered as a result of a condition, such as an addition, deletion or modification of one or more of the device settings.

Figure 4:
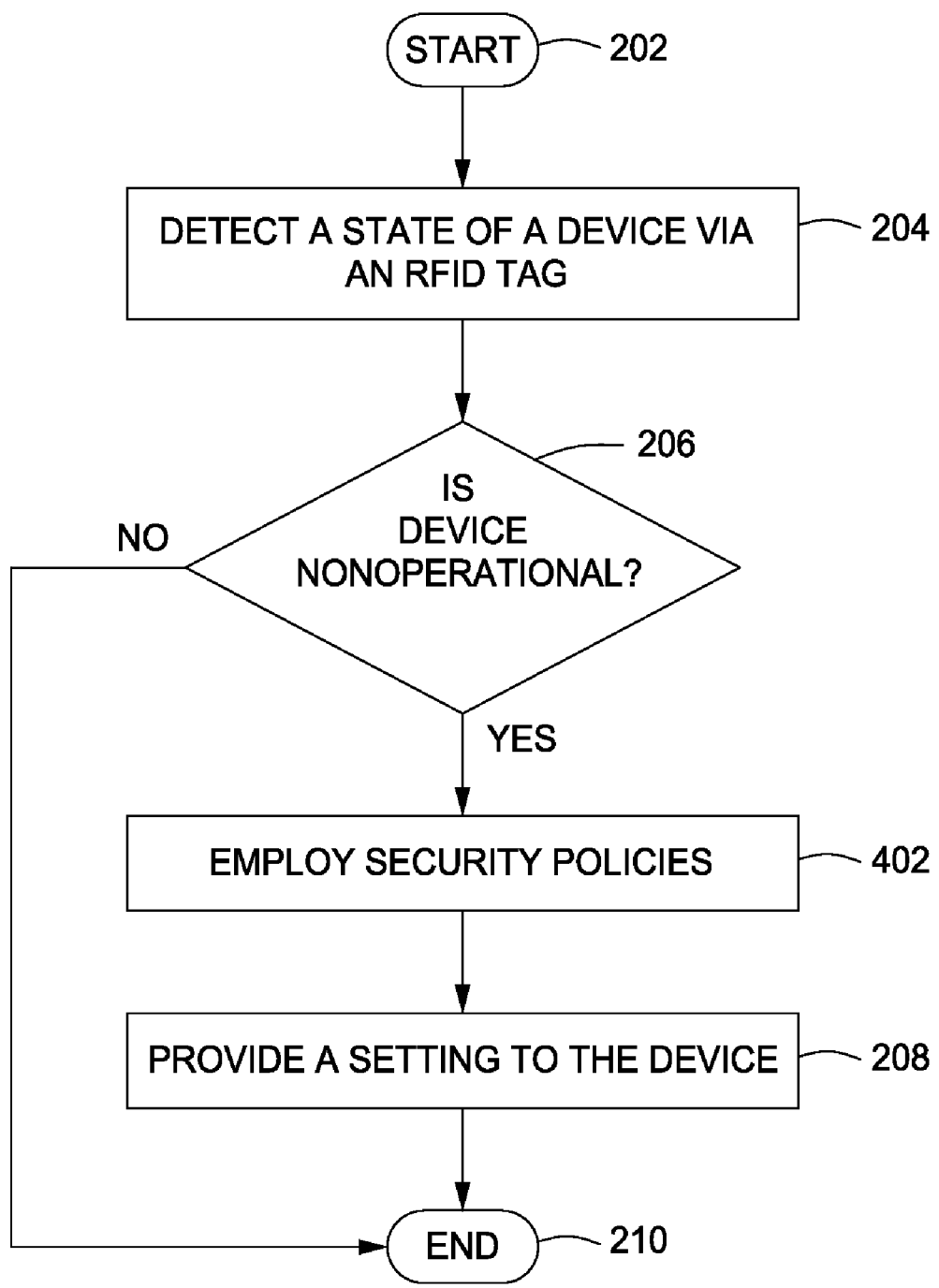
FIG. 4 is another flow diagram illustrating an example flow for configuring and/or provisioning a device when the device is nonoperational.

FIG. 4 is a flow diagram illustrating an example flow 400 for configuring and/or provisioning a device. For convenience, the flow 400 is described with reference to the system 100 of FIG. 1 and the flow 200 of FIG. 2. The flow 200 may be carried out using other architectures as well. For ease of exposition, the following uses possessive form with respect to the RFID interrogator 104, the RFID tag 106 and/or the device 102 so as to differentiate the elements of thereof. In addition, the flow 400 is similar to the flow 200 of FIG. 2, except as described herein below.

After making the affirmative determination at decision block 206, the flow 400 transitions to process block 402. At process block 402, the RFID tag 106 employs one or more of the security policies. The RFID tag 106, or more specifically, the tag's logic 134 causes the tag's RF transceiver 138 to transmit, via the tag-modulated-RF signal, a request for security credentials ("authentication request") to the interrogator's antenna 118. This may be done responsive to the interrogator's transceiver 116 transmitting the device-state request and/or the device-setting request to the RFID tag 106.

In response to the authentication request, the interrogator's RF transceiver 138 may transmit, via the modulated-RF signals, a response to the authentication request ("authentication response"). This authentication response includes the appropriate authentication credentials.

The appropriate authentication credentials requested and received by the RFID tag 106 may differ based on the nonoperational state, as noted above. If, for example, the nonoperational state indicates that the device 102 is unpowered, then the RFID tag 106 may employ the first security level, and accordingly, might not request any authentication credentials. Alternatively, the RFID tag 106 employ the second and/or third security levels when the nonoperational state indicates that the device 102 is powered, but otherwise nonoperational (e.g., one of the device's interfaces is active and/or the device 102 is carrying out one of the device functions via such interface).

After process block 402, the flow 400 may transition to process block 208; at which point the flow 400 may be carried out as described above with respect to flow 200 (FIG. 2). Although process block 402 is shown as occurring after decision block 206, the process block 402 may be carried out during negotiation between the RFID tag 106 and the RFID interrogator establishing the first communication. In this case, the RFID tag 106 may employ one or more of the security levels, as appropriate. If, for example, the nonoperational state is not known, then the RFID tag 106 may employ the third security level, as a conservative measure. Alternatively, the RFID tag 106 may employ the security level that requests only a shared key.

Alternative Example Architectures

Figure 5:
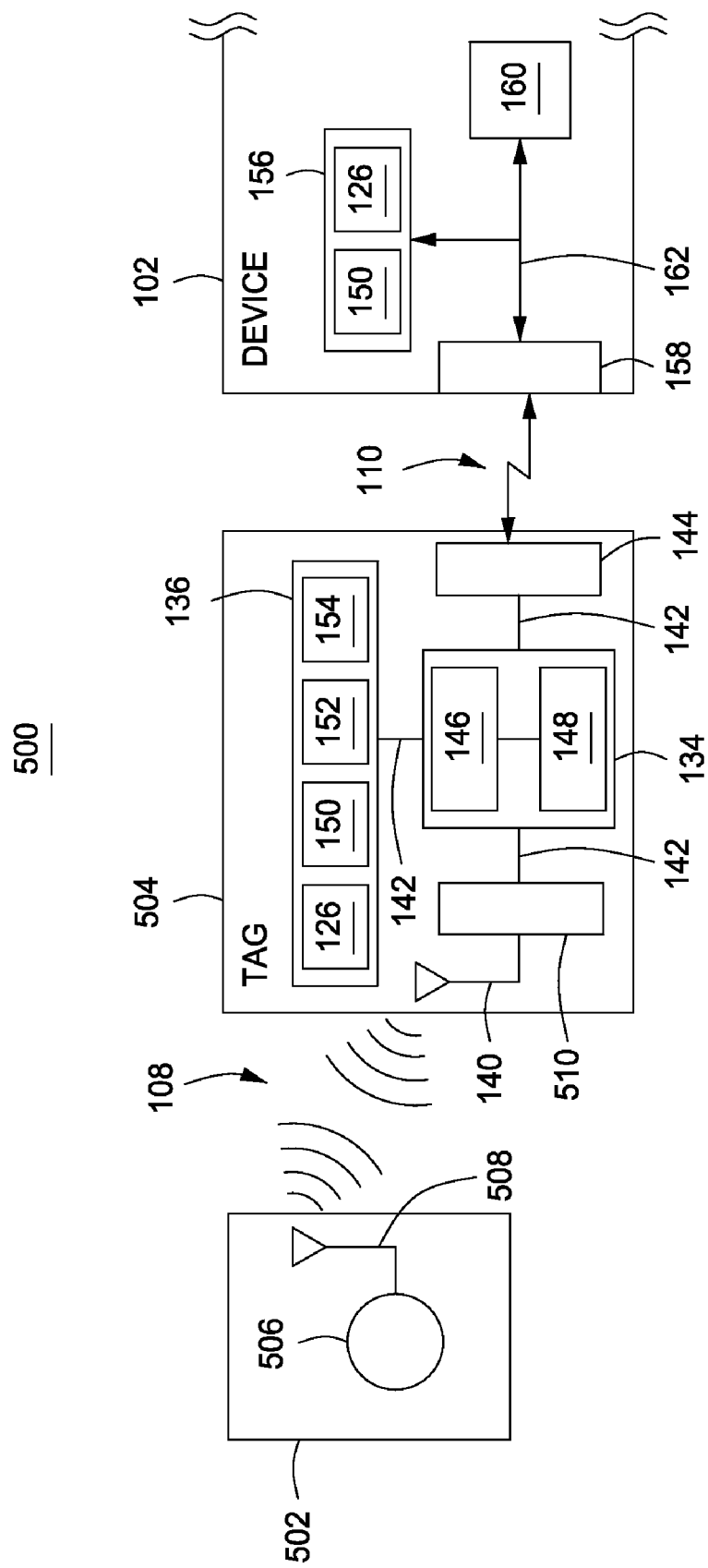
FIG. 5 is a block diagram illustrating an example system for remotely configuring and/or provisioning a device when it is nonoperational.

FIG. 5 is a block diagram illustrating an example system 500 for remotely configuring and/or provisioning a device, such as device 102, when it is nonoperational. The system 500 is similar to the system 100, except as described herein below. The system includes a source of electromagnetic energy ("em source") 502 and an RFID tag 504.

The em source 502 includes a RF generator 506 and an antenna 508. The RF generator 506 is operable to transmit, via the antenna 508, an RF signal ("em-RF signal").

In addition to the elements noted above with respect to the RFID tag 106, the RFID tag 504 includes an RF receiver 510 for receiving the em-RF signal and for using the em-RF signal to power the RFID tag 504. As above, the RFID tag 504 may be adapted to use the power to establish the second communication. The RFID tag 106 may also be adapted to use and/or transmit the power to the device 102 so as to set the device settings 126 when the device 102, as a whole or portions thereof, are otherwise unpowered.

Instead of obtaining the device settings 126 from an external source (e.g., the RFID interrogator 104 of FIG. 1), the device setting 126 are stored in the tag's memory 136. As such, the RFID tag 504 operates in the autonomous mode or the semi-autonomous mode using the em-RF signal for powering the RFID tag 504 and/or as a trigger for carrying the flows 200, 300 and/or 400.

In addition, the system 500 may be used in conjunction with an RFID interrogator, such as the RF interrogator 104 of FIG. 1. This RF interrogator may be operable to transfer the device setting 126 to the RFID tag 504. This way, the tag's memory 136 may be populated with the device settings 126 prior to disposing or otherwise locating the RFID tag 504 on or proximate to the device 102 or the support structure.

Figure 6:
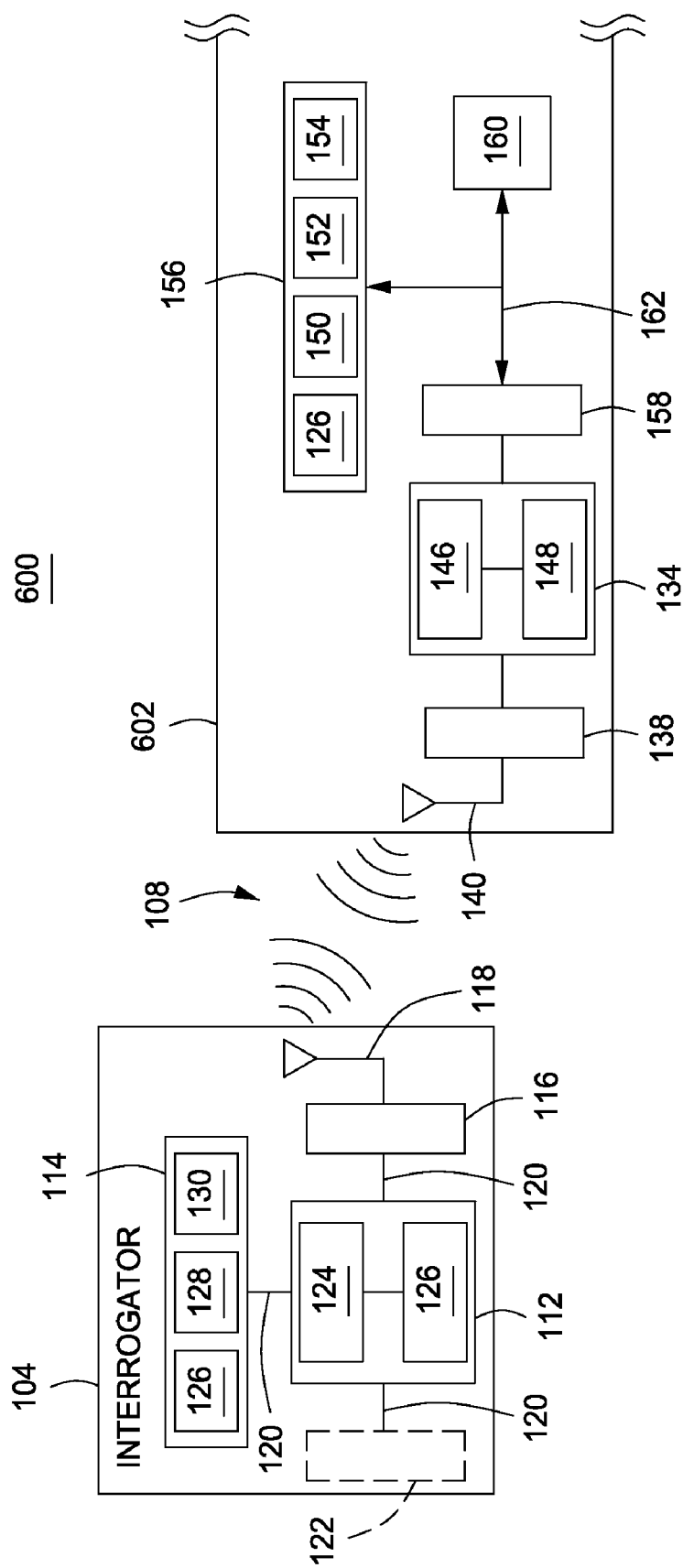
FIG. 6 is a block diagram illustrating an example system 600 for remotely configuring and/or provisioning a device when it is nonoperational.

FIG. 6 is a block diagram illustrating an example system 600 for remotely configuring and/or provisioning a device when it is nonoperational. The system 500 is similar to the system 100, except as described herein below. The system includes the RFID interrogator 104 and the device 602. The device 602 is essentially a combination of the device 102 and the RFID interrogator (FIG. 1) except that (i) the tag's I/O interface 144 is integrated into the device's I/O interface 158, and (ii) the tag's memory 136 is integrated into the device's memory 156. The device 602 may operate in any of the autonomous, semi-autonomous, and/or host controlled modes.

Conclusion

Those skilled in the art will appreciate that the present invention, according to its various embodiments, Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

In addition, the system and method may employ alternative technologies to the RFID technologies described above, including Bluetooth™, near-field communications (e.g., near-field magnetics), sensor networks and others not mentioned herein. Although the cost of such technologies makes these embodiments less desirable at present, within the foreseeable future such embodiments may prove to be cost-effective. In addition, the communication links described above may be part of or access a communication network. This communication network may be a partial or full deployment of most any communication or computer network, and thus, can include a few or many network elements, most of which are not shown. Each of the communication networks may include circuit-switched as well as packet-data elements to provide transport, and can be public or private, terrestrial wireless or satellite, and/or wireline.

Each of the networks may include portions of a Public Switch Telephone Network (PSTN), the Internet, core and proprietary public networks, wireless voice and packet-data networks, such as 1 G, 2 G, 2.5 G and 3 G telecommunication networks, wireless office telephone systems ("WOTS") and/or wireless local area networks (WLANs), including, Bluetooth and/or IEEE 802.11 WLANs, and the like. In addition, such communication network may be configured in accordance with any communication protocols such as Advanced Mobile Phone Service ("AMPS"), Time Division Multiple Access ("TDMA"), Global System for Mobile Communications ("GSM"), and Code Division Multiple Access ("CDMA"), Universal Mobile Telecommunications Service ("UMTS"), Wide-band CDMA ("WCDMA"), ultra wideband CMDA, CDMA2000, Generic Packet Radio Services ("GPRS"), Telecommunications Industry Association's ("TIA") IS-94 specifications, and any combination or variation thereof.

The communication protocols may also include any LAN, WLAN, WMAN, and/or PAN protocols, which may include any of the commonly used protocols, such as the IEEE 802.11 et seq.; IEEE 802.16 protocol, the IEEE 802.15 protocol, the ZigBee specification, the Bluetooth Specification, the WOTS specification, the HiperLAN specification, the HomeRF specification and/or any other wireless-networking protocol that promulgates rules to use freely-available, unlicensed spectrum, which in the United States includes the Industrial, Scientific, and Medical ("ISM") bands. Furthermore, the communication protocols may include one or more protocols for hypertext-markup language ("HTML"), extensible-markup language ("XML"), Virtual Reality Modeling Language ("VRML"), file transfer protocol ("FTP"), simple-mail-transfer protocol ("SMTP"), session-initiation protocol ("SIP"), etc.

In addition, the EPC may be used to communicate the device state 150. For example, when operating in the autonomous mode, the RFID tag 104 may incorporate the device state into the EPC and provide the EPC in response to the device-state request.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

Exemplary embodiments have been illustrated and described. Further, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method comprising:
   detecting, via a radio frequency identification ("RFID") tag, a state of a device that is communicatively coupled to the RFID tag;
   determining, via information provided by the RFID tag, that the state of the device signifies that the device or a portion thereof is powered off; and
   as a result of determining that the state of the device signifies that the device or a portion thereof is powered off, providing a setting for the device via the RFID tag,
   wherein the RFID tag, using programming code stored in memory within the RFID tag, prevents setting the setting for the device unless the device or a portion thereof is powered off as indicated by the state of the device detected and determined by the RFID tag.

2. The method of claim 1, wherein the device is adapted to use the setting during operation.

3. The method of claim 1, wherein detecting a state of a device comprises:
   establishing a first communication with the radio frequency identification ("RFID") tag;
   establishing a second communication with the device; and
   interrogating the device to obtain the state.

4. The method of claim 3, wherein establishing a second communication comprises: establishing the second communication with a memory communicatively coupled to the RFID tag, and wherein interrogating the device comprises: interrogating the memory to obtain the state.

5. The method of claim 3, wherein establishing a first communication with the radio frequency identification ("RFID") tag comprises: providing, in accordance with a given security policy, a credential to authenticate a provider of the setting.

6. The method of claim 5, wherein the given security policy defines first and second levels of security, wherein the first level of security is less secure than the second level of security, and wherein providing a credential comprises: providing the credential in accordance with the first level of security when the state signifies that the device or a portion thereof is powered off.

7. The method of claim 6, wherein providing a credential further comprises: providing the credential in accordance with the second level of security when the state signifies that the device is operational.

8. The method of claim 3, wherein establishing a second communication with the device comprises: obtaining access to the device in accordance with a given security policy.

9. The method of claim 8, wherein the given security policy defines first and second levels of security, wherein the first level of security is less secure than the second level of security, and wherein obtaining access to the device comprises: obtaining access to the device in accordance with the first level of security when the state signifies that the device or a portion thereof is powered off.

10. The method of claim 9, wherein the device includes an interface, wherein detecting a state of a device comprises: detecting when the interface is inactive, and wherein obtaining access to the device comprises: obtaining access to the device in accordance with the second level of security when the state signifies that the interface is inactive.

11. A method comprising:
    detecting, at a radio frequency identification ("RFID") tag, a state of a device that is communicatively coupled to the RFID tag;
    determining, via information provided by the RFID tag, that the state of the device signifies that the device or a portion thereof is powered off; and
    as a result of determining that the state of the device signifies that the device or a portion thereof is powered off providing a setting for the device via the RFID tag,
    wherein the RFID tag, using programming code stored in memory within the RFID tag, prevents setting the setting for the device unless the device or a portion thereof is powered off as indicated by the state of the device detected and determined by the RFID tag.

12. The method of claim 11, wherein the device is adapted to use the setting during operation.

13. The method of claim 11, wherein detecting a state of a device comprises:
    establishing a communication with the with the device; and
    interrogating the device to obtain the state.

14. The method of claim 13, wherein establishing a communication comprises: establishing the communication with a memory communicatively coupled to the RFID tag, and wherein interrogating the device comprises: interrogating the memory to obtain the state.

15. The method of claim 13, further comprising: obtaining at the radio frequency identification ("RFID") tag, in accordance with a given security policy, a credential to authenticate a provider of the setting.

16. The method of claim 15, wherein the given security policy defines first and second levels of security, wherein the first level of security is less secure than the second level of security, and wherein obtaining a credential comprises: obtaining the credential in accordance with the first level of security when the state signifies that the device or a portion thereof is powered off.

17. The method of claim 16, wherein obtaining a credential further comprises: obtaining the credential in accordance with the second level of security when the state signifies that the device is operational.

18. The method of claim 13, wherein establishing a communication with the device comprises: obtaining access to the device in accordance with a given security policy.

19. The method of claim 18, wherein the given security policy defines first and second levels of security, wherein the first level of security is less secure than the second level of security, and wherein obtaining access to the device comprises: obtaining access to the device in accordance with the first level of security when the state signifies that the device or a portion thereof is powered off.

20. The method of claim 19, wherein the device includes an interface, wherein detecting a state of a device comprises: detecting when the interface is inactive, and wherein obtaining access to the device comprises: obtaining access to the device in accordance with the second level of security when the state signifies that the interface is inactive.

21. A system comprising: a first device disposed remotely from a radio frequency identification ("RFID") tag that is disposed proximate to and is communicatively coupled to a second device, wherein: the first device is adapted to (i) detect, via the RFID tag, a state of the second device and (ii) as a result of determining that the state of the device signifies that the second device or a portion thereof is powered off, provide a setting for the second device via the RFID tag,
wherein the RFID tag, using programming code stored in memory within the RFID tag, is configured to prevent setting the setting for the second device unless the second device or a portion thereof is powered off as indicated by the state of the second device detected and determined by the RFID tag.

22. The system of claim 21, wherein the second device is adapted to use the setting during operation.

23. The system of claim 21, wherein the first device is further adapted to (i) establish a first communication with the radio frequency identification ("RFID") tag, (ii) cause the RFID tag to establish a second communication with the second device, and (iii) interrogate the second device to obtain the state.

24. The system of claim 23, wherein the RFID tag is adapted to establish a second communication with the second device.

25. The system of claim 24, further comprising: a memory disposed proximate to and communicatively coupled to the radio frequency identification ("RFID") tag, wherein the first device is further adapted to (i) cause the RFID tag to establish the second communication with the memory and (ii) interrogate the memory to obtain the state.

26. The system of claim 21, wherein the first device is further adapted to provide, in accordance with a given security policy, a credential to authenticate a provider of the setting.

27. The system of claim 26, wherein the given security policy defines first and second levels of security, wherein the first level of security is less secure than the second level of security, and wherein the first device is adapted to provide the credential in accordance with the first level of security when the state signifies that the second device or a portion thereof is powered off.

28. The system of claim 27, wherein the first device is further adapted to provide the credential in accordance with the second level of security when the state signifies that the second device is operational.

29. The system of claim 21, wherein the radio frequency identification ("RFID") tag is adapted to provide the first device with access to the second device in accordance with a given security policy.

30. The system of claim 29, wherein the given security policy defines first and second levels of security, wherein the first level of security is less secure than the second level of security, and wherein the radio frequency identification ("RFID") tag is adapted to provide the first device with access to the second device in accordance with the first level of security when the state signifies that the second device or a portion thereof is powered off.

31. The system of claim 30, wherein the second device includes an interface, and wherein the radio frequency identification ("RFID") tag is adapted to provide the first device with access to the second device in accordance with the second level of security when the state signifies that the interface is inactive.

32. A method comprising:
receiving, at a first device from a source of electromagnetic energy via a wireless medium, an emission of energy for powering the first device, wherein the first device is adapted to excite a radio frequency identification ("RFID") tag, and wherein the first device has stored thereon a setting for transfer to a second device that is communicatively coupled to the RFID tag;
exciting the RFID tag responsive to receiving the emission of energy;
detecting, via the RFID tag, a state of the second device;
determining, via information provided by the RFID tag, that the state of the second device signifies that the second device or a portion thereof is powered off; and
as a result of determining that the state of the second device signifies that the second device or a portion thereof is powered off, providing the setting for the second device via the RFID tag,
wherein the RFID tag, using programming code stored in memory within the RFID tag, prevents setting the setting for the second device unless the second device or a portion thereof is powered off as indicated by the state of the second device detected and determined by the RFID tag.

33. The method of claim 32, wherein the second device is adapted to use the setting during operation.

34. The method of claim 32, wherein detecting a state of a second device comprises:
establishing a first communication between the first device and the radio frequency identification ("RFID") tag;
establishing a second communication with the second device; and
interrogating the second device to obtain the state.

35. The method of claim 34, wherein establishing a second communication comprises: establishing the second communication with a memory communicatively coupled to the RFID tag, and wherein interrogating the second device comprises: interrogating the memory to obtain the state.

36. The method of claim 34, wherein establishing a first communication between the first device and the radio frequency identification ("RFID") tag comprises: providing, in accordance with a given security policy, a credential to authenticate the first device.

37. The method of claim 36, wherein the given security policy defines first and second levels of security, wherein the first level of security is less secure than the second level of security, and wherein providing a credential comprises: providing the credential in accordance with the first level of security when the state signifies that the second device or a portion thereof is powered off.

38. The method of claim 37, wherein providing a credential further comprises: providing the credential in accordance with the second level of security when the state signifies that the second device is operational.

39. The method of claim 34, wherein establishing a second communication comprises: obtaining access to the second device in accordance with a given security policy.

40. The method of claim 39, wherein the given security policy defines first and second levels of security, wherein the first level of security is less secure than the second level of security, and wherein obtaining access to the device comprises: obtaining access to the device in accordance with the first level of security when the state signifies that the second device or a portion thereof is powered off.

41. The method of claim 40, wherein the second device includes an interface, wherein detecting a state of a device comprises: detecting when the interface is inactive, and wherein obtaining access to the device comprises: obtaining access to the second device in accordance with the second level of security when the state signifies that the interface is inactive.

42. The method of claim 32, further comprising: receiving, from the source of electromagnetic energy via a wireless medium, a second emission of energy for powering the first device and for providing the setting to the first device for storage thereon.

43. A system comprising: a source of electromagnetic energy for providing, via a wireless medium, an emission of energy for powering a first device that is proximate to a radio frequency identification ("RFID") tag that is disposed proximate to and is communicatively coupled to a second device, wherein the first device has stored thereon a setting for transfer to the second device, and wherein the first device is adapted to (i) excite the RFID tag responsive to reception of the emission of energy, (ii) detect, via the RFID tag, a state of the second device and (iii) as a result of determining that the state of the second device signifies that the second device or a portion thereof is powered off, provide the setting for the second device via the RFID tag, wherein the RFID tag, using programming code stored in memory within the RFID tag, is configured to prevent setting the setting for the second device unless the second device or a portion thereof is powered off as indicated by the state of the second device detected and determined by the RFID tag.

44. The system of claim 43, wherein the second device is adapted to use the setting during operation.

45. The system of claim 43, wherein the first device is further adapted to (i) establish a first communication with the radio frequency identification ("RFID") tag, (ii) cause the RFID tag to establish a second communication with the second device, and (iii) interrogate the second device to obtain the state.

46. The system of claim 45, further comprising: a memory disposed proximate to and communicatively coupled to the radio frequency identification ("RFID") tag, wherein the first device is further adapted to (i) cause the RFID tag to establish the second communication with the memory and (ii) interrogate the memory to obtain the state.

47. The system of claim 45, wherein the first device is further adapted to provide, in accordance with a given security policy, a credential to authenticate the first device.

48. The system of claim 47, wherein the given security policy defines first and second levels of security, wherein the first level of security is less secure than the second level of security, and wherein the first device is adapted to provide the credential in accordance with the first level of security when the state signifies that the second device or a portion thereof is powered off.

49. The system of claim 48, wherein the first device is further adapted to provide the credential in accordance with the second level of security when the state signifies that the second device is operational.

50. The system of claim 45, wherein the radio frequency identification ("RFID") tag is adapted to provide the first device with access to the second device in accordance with a given security policy.

51. The system of claim 50, wherein the given security policy defines first and second levels of security, wherein the first level of security is less secure than the second level of security, and wherein the radio frequency identification ("RFID") tag is adapted to provide the first device with access to the second device in accordance with the first level of security when the state signifies that the second device or a portion thereof is powered off.

52. The system of claim 51, wherein the second device includes an interface, and wherein the radio frequency identification ("RFID") tag is adapted to provide the first device with access to the second device in accordance with the second level of security when the state signifies that the interface is inactive.

53. The system of claim 43, wherein the RFID tag is adapted to establish a second communication with the second device.

* * * * *

UNITED STATES PATENT AND TRADEMARK OFFICE
CERTIFICATE OF CORRECTION

| | | |
|---|---|---|
| PATENT NO. | : 8,098,160 B2 | |
| APPLICATION NO. | : 12/113348 | |
| DATED | : January 17, 2012 | |
| INVENTOR(S) | : Howarth et al. | |

It is certified that error appears in the above-identified patent and that said Letters Patent is hereby corrected as shown below:

On the front page of the patent, section (75), replace "Chandroadya Prasad" with
-- Chandrodaya Prasad --.

Signed and Sealed this
Seventeenth Day of April, 2012

David J. Kappos
*Director of the United States Patent and Trademark Office*